US005703594A

United States Patent [19]
Anderson

[11] Patent Number: 5,703,594
[45] Date of Patent: Dec. 30, 1997

[54] METHOD FOR REMOTELY DETECTING TIDES AND THE HEIGHT OF OTHER SURFACES

[75] Inventor: Kenneth D. Anderson, San Diego, Calif.

[73] Assignee: The United States of America as represented by the Secretary of the Navy, Washington, D.C.

[21] Appl. No.: 668,874

[22] Filed: Jun. 24, 1996

[51] Int. Cl.⁶ ................................................ G01S 13/58
[52] U.S. Cl. ........................ 342/123; 342/126; 342/22; 367/99
[58] Field of Search ....................... 342/22, 25, 123, 342/124, 126; 367/99

[56] References Cited

U.S. PATENT DOCUMENTS

| | | | |
|---|---|---|---|
| 2,147,810 | 2/1939 | Alford | 342/25 |
| 2,256,539 | 9/1941 | Alford | 342/22 |
| 3,900,260 | 8/1975 | Wendt | 356/5 |
| 4,595,925 | 6/1986 | Hansen | 342/25 |
| 5,113,193 | 5/1992 | Powell et al. | 342/25 |
| 5,327,145 | 7/1994 | Jelinek | 342/453 |

*Primary Examiner*—J. Woodrow Eldred
*Attorney, Agent, or Firm*—Harvey Fendelman; Michael A. Kagan; Peter A. Lipovsky

[57] ABSTRACT

Transmitted signals are used to accurately and remotely determine the vertical distance of an earth-based receiving antenna above a surface, and hence can be used to determine the tide condition of a water surface. A signal is transmitted from a signal source as it moves either through air or space. An antenna whose height is to be determined with respect to a reflecting surface, such as water, receives the signal directly from the signal source and indirectly from the signal source by reflection of the signal from the reflecting surface. The sum of the directly and indirectly received signals form an interference pattern as the signal source is moved. Points on the interference pattern are selected at identical phase angle for each cycle of the pattern. The points are assigned reference numbers and the numbers are plotted with respect to a measurement indicative of the distance between the signal source and the antenna whose height with respect to the reflecting surface is to be determined. The slope or gradient of the reference numbers with respect to this measurement is determined. Reference interference patterns are generated either through mathematical modelling and/or through direct physical measurement and these are used to establish an equation relating known antenna-to-surface distances to the slopes of the reference numbers verses measurement. The slope corresponding to the antenna of an unknown distance from a surface is inserted into this equation and the equation is solved for the unknown distance.

14 Claims, 6 Drawing Sheets

METHOD FOR REMOTELY DETECTING TIDES AND THE HEIGHT OF OTHER SURFACES

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

This invention pertains broadly to the field of communications. In greater particularity, the invention pertains to using a signal and a transducer to determine the distance between the transducer and a surface upon which the signal reflects. More particularly, the invention pertains to utilizing an antenna to assess tide conditions.

2. Description of the Related Art

Knowledge of the vertical distance between an earth-based antenna and a water surface is valuable. For example, a shore-based antenna located on the coast can be used as a tide gauge to monitor the ebb and flow of the ocean. A second example is an antenna mounted on a ship that can be used to determine both displacement and freeboard of the ship.

The vertical distance or height of an earth-based receiving antenna above a water surface is usually determined through the combination of both geodesy (geodetic surveying), to establish the receiving antenna location on the earth (latitude, longitude and height above the geoid), and through either direct measurements or calculations of the height of the water surface in relation to the geoid. For most land-based surveying work in North America, the height at a location is referenced to an accurate vertical land datum such as the North American Vertical Datum of 1988 (NAVD 88). Tide gauges, which directly measure the height of a water surface through various means, are referenced to NAVD 88. By simple addition or subtraction, one is readily able to determine the height at a location above the water surface that is measured by a tide gauge.

Tide gauges directly sense water height using either a mechanical float or an acoustic transducer and, because they or the stilling well utilized with them are in contact with water, are susceptible to damage by storm surges. In addition, there must be a tide gauge installed directly on the body of water that is of interest. In certain instances, it can be very difficult to position a gauge. For example, along the coast, the surf action generally precludes the installation of a tide gauge because of the destructive and forceful nature of waves. On remote islands, for example, logistics may make it prohibitively expensive to install and maintain a gauge.

To estimate an antenna's height above water at a site where there is no tide gauge, one can use tide gauge measurements from at least several sites in the vicinity of the site of interest and then mathematically estimate the tide height at the site of interest. For example, there is no tide gauge on the ocean side of the Point Loma Peninsula of Southern California, but there are tide gauges at both the Scripps Pier off La Jolla and at the Broadway Pier located in San Diego Harbor. Applying hydrology and geodesy techniques to many years of data from these two sites, one can create a model of the Point Loma tide. However, the model is secular (long term) and therefore unable to adequately describe short-term effects such as storm surges.

Because of difficulties encountered with traditional tide gauge techniques, alternatives have been sought.

SUMMARY OF THE INVENTION

The invention uses signals transmitted from an airborne or spaceborne source to accurately and remotely determine the vertical distance of an earth-based receiving antenna above a water surface, and hence can be used to determine the height or tide condition of the water surface. In the process of the invention, a signal is transmitted from a signal source as it moves either through air or space. An antenna whose height is to be determined with respect to a reflecting surface, such as water, receives the signal directly from the signal source and indirectly from the signal source by reflection of the signal from the reflecting surface. The sum of the directly and indirectly received signals form an interference pattern as the signal source is moved. Points on the plotted interference pattern are selected at identical phase angle for each cycle of the pattern. The points are assigned reference numbers and the numbers are plotted with respect to a measurement indicative of the distance between the signal source and the antenna whose height with respect to the reflecting surface is to be determined. The slope or gradient of the reference numbers with respect to this measurement is determined. Reference interference patterns are generated either through mathematical modelling and/or through direct physical measurement and these are used to establish an equation relating known antenna-to-surface distances to the slopes of the reference numbers verses measurement. The slope corresponding to the antenna of an unknown distance from a surface is inserted into this equation and the equation is solved for the unknown distance.

OBJECTS OF THE INVENTION

An object of this invention to ascertain the height of an object above a surface.

Another object of this invention to ascertain the height of a signal transducer above a surface.

A further object of this invention is to ascertain the height of an antenna above a water surface.

Yet another object of this invention is to determine the height of an antenna above a water surface without the need to penetrate the water surface.

Still a further object of this invention is to provide a tide gauge.

Yet another object of this invention is to provide a tide gauge that does not require penetration of, or immersion within, a water surface.

Other objects, advantages and new features of the invention will become apparent from the following detailed description of the invention when considered in conjunction with the accompanied drawings.

DESCRIPTION OF THE PREFERRED EMBODIMENT

Figure 1:
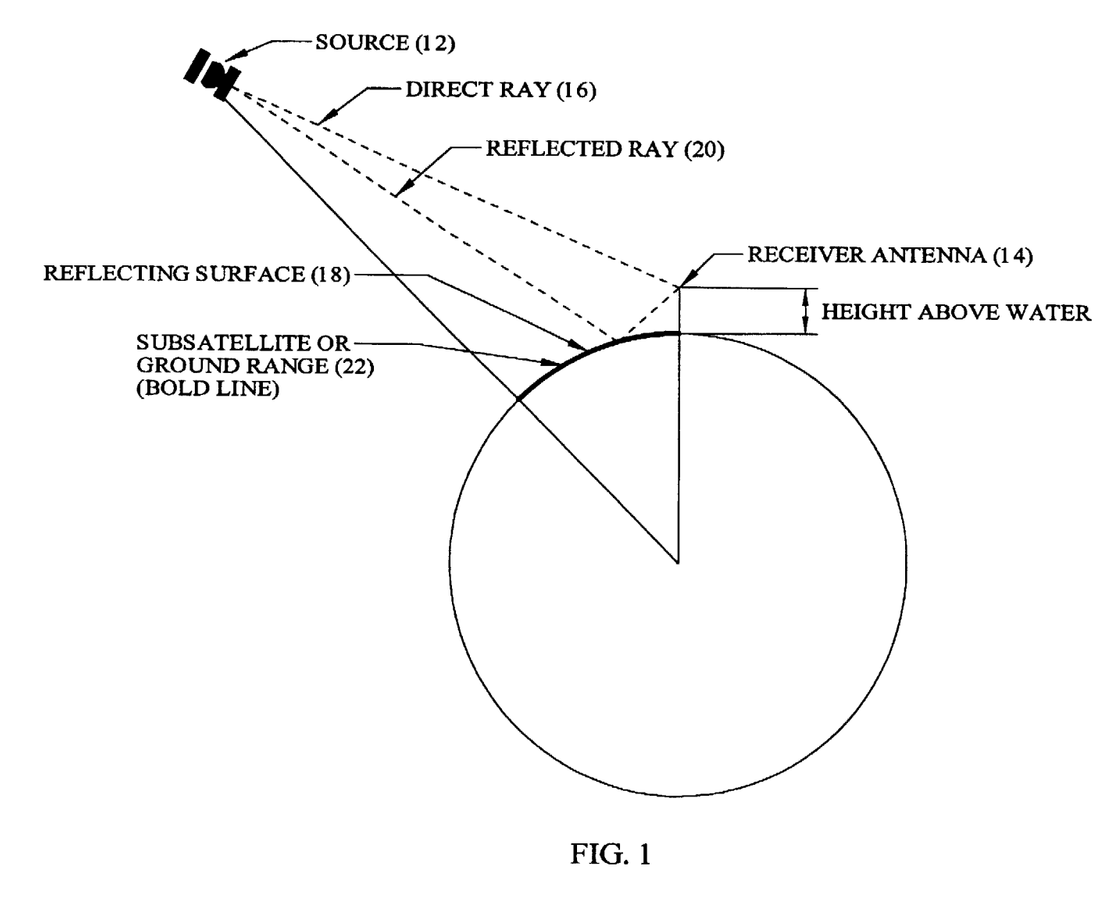
FIG. 1 is a diagrammatical illustration of a representative utilization of the invention.

Referring now to FIG. 1, a utilization of the invention is illustrated diagrammatically. In the preferred embodiment of the invention, radio frequency signals are transmitted from an airborne or spaceborne signal source 12 and are received by an earth-based antenna 14. Though radio frequency signals and an antenna are referred to here for example purposes, a wide variety of transmissions and receiver/ transducers could be used utilizing any acoustic or electromagtic waveforms, such as Continuous Wave, Pulse, Spread Spectrum, as well as light such as projected by lasers and the like.

Referring again to FIG. 1, source 12 is moving such that its geometry in relation to receiving antenna 14 is such that there are exactly two transmission paths of "ray paths" connecting it and the receiver. One ray path travels through the atmosphere directly between source 12 and receiver 14. This ray path is called a direct ray path, or simply a direct ray (16). The second ray travels a path from source 12 to reflecting surface 18 where it is reflected into receiving antenna 14. This ray path is called the reflective ray path or simply a reflected ray (20).

One measure of the separation distance between source 12 and antenna receiver 14 is the ground range otherwise known as the subsatellite range 22 (shown in bold), defined as the range along the earth's surface from the base of the receiver to the nadir of the satellite. For purposes of the invention, this separation distance or measurement could be represented by a number of other forms such as elevation angle at the receiver, transmission slant range, etc. As can be seen from FIG. 1, as source 12 moves in relation to receiver antenna 14, the path length difference between the direct and reflected ray will change, thus giving rise to an interference pattern present at the receiver.

For example purposes, the transmitted signal is assumed to be horizontally polarized continuous waves (CW). At some ground range, the difference between the distance traveled by the direct ray and the reflected ray, or path length difference, is an exact multiple of the transmitted signal's wavelength. At this range, assuming a perfectly smooth reflecting surface, the receiver will measure zero signal strength. This is because the direct ray path signal is exactly out of phase with the reflected path signal and their sum, as measured at receiver 14, is zero.

At some other range closer or further away, the difference will be an odd multiple of half of the wavelength. At this range, the receiver antenna will measure twice the magnitude of the individual signal. This is because the rays are exactly in-phase at the receiver antenna and their sum, as measured by the receiver, is twice their individual value. As signal source 12 moves through greater or lesser ranges, there may be many ranges where the received signals are in-phase, adding to a maximum signal received, and many ranges where the received signals are directly out-of-phase, adding to a minimum received signal. This is called an interference pattern and is also known as Lloyd's Mirror.

Figure 2:
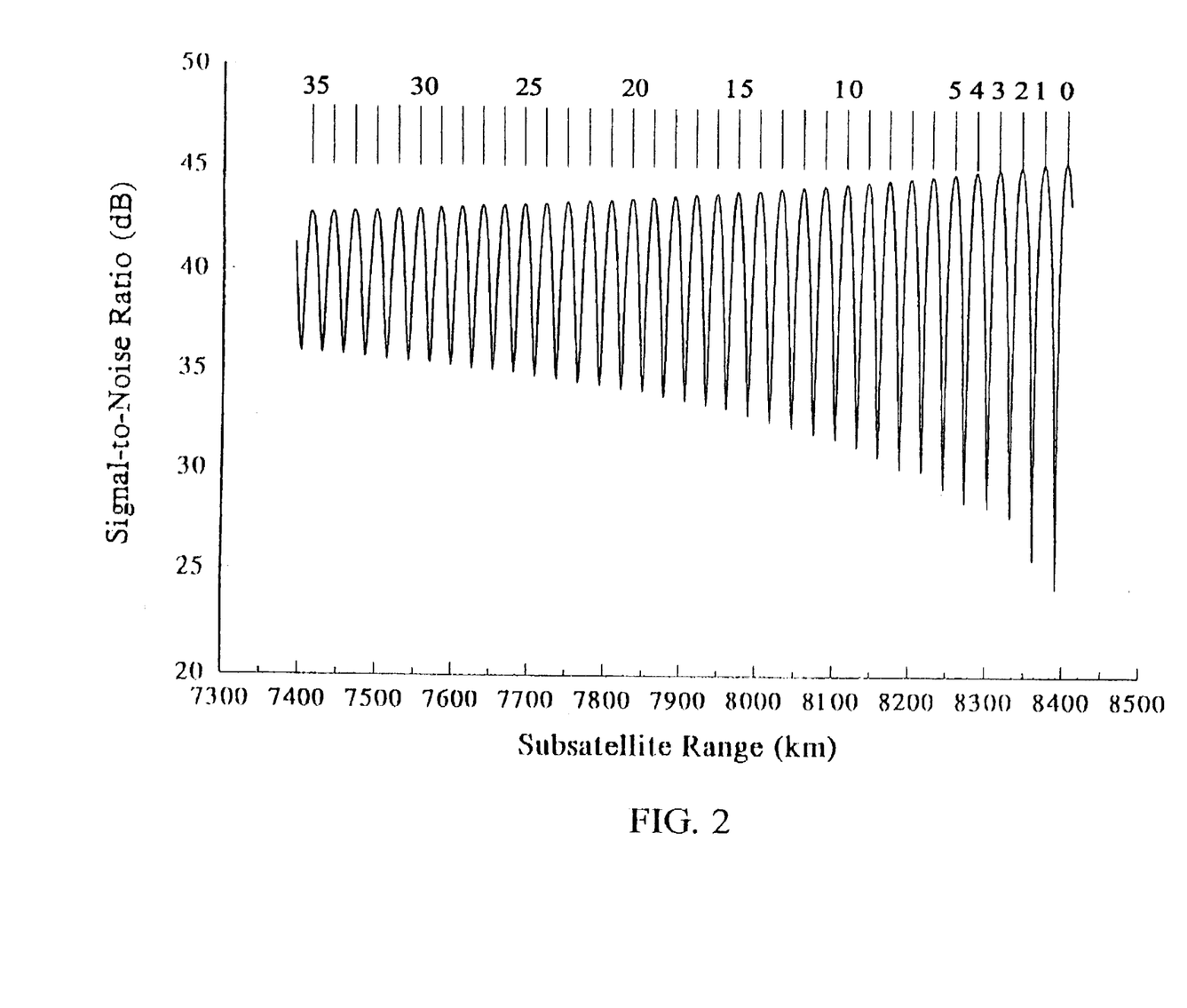
FIG. 2 illustrates an interference pattern as would be created through utilization of the invention.

An example of an interference pattern generated from a transmission from a Global Positioning System (GPS) satellite to an earth-based receiver having a known-height of 21.2 meters above a water surface is shown in FIG. 2. The interference pattern was created through ray optic techniques known to those skilled in the art such as those described in the 1980 edition of "Principles of Optics" by Max Born and Emil Wolf.

In FIG. 2, instead of signal intensity (applicable to CW signals), the signal is plotted as signal-to-noise ratio (SNR), which can be measured by any suitable GPS receiver. This example uses the GPS L1 signal (1,575.42 MHz). The abscissa is subsatellite range, which is defined as the range along the earth's surface from the base of the receiver antenna to the nadir of the satellite, and corresponds to satellite geometric elevation angles from about 10° at 7400 kilometers to about 1° at 8400 kilometers. The interference pattern is clearly evident and the location of the SNR maxima or peaks are indicated by the vertical hash marks.

According to the invention, an arbitrary integer reference number is assigned to the location of peaks on the interference pattern. The location of the points selected could be anywhere on the interference pattern and need not be at the peaks of the interference pattern, however the points should be selected to be at substantially the same phase angle for each cycle of the pattern. In this example, the reference numbers are chosen to increase as range decreases and decrease as range increases. One could choose the opposite if one so desired.

In FIG. 2, the peak at 8400 kilometers is assigned the number 0. The peak to the left of this is assigned the number 1, and so on such that the last peak, at about 7400 kilometers, is assigned the number 35. The reference numbers should be assigned sequentially, either increasing as range or other measurement of distance between the signal source and receiver decreases or decreasing as range or other measurement of distance between the signal source and receiver increases.

Figure 3:
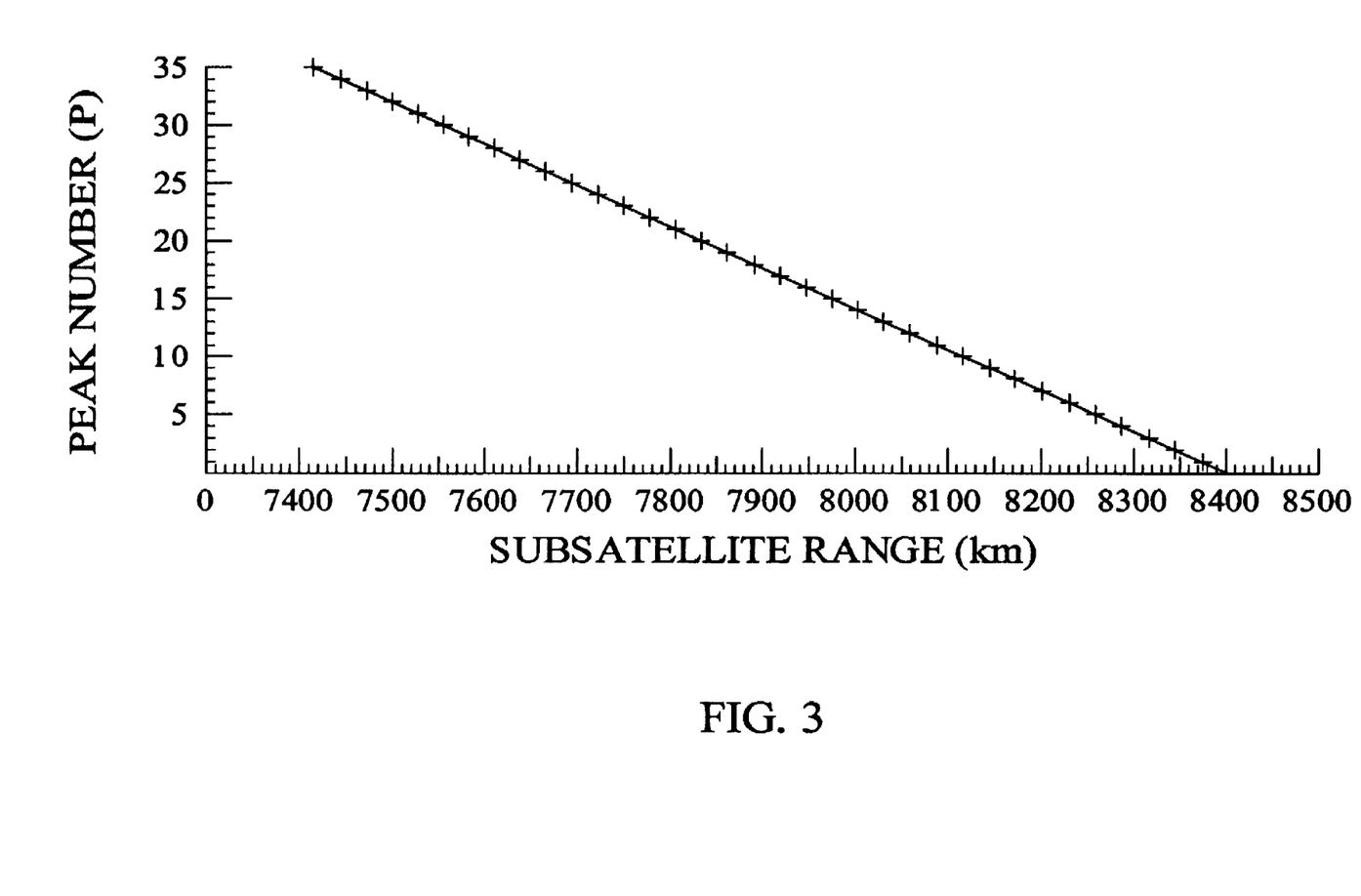
FIG. 3 shows the relationship between reference numbers as utilized in the invention and a measurement indicative of the distance between a signal source and an antenna under consideration (subsattellite range).

FIG. 3 shows a plot of range (subsatellite range) versus peak number for the interference pattern shown in FIG. 2. How the slope or gradient of the data shown in FIG. 3 can be used to ascertain the height of an antenna above a reflecting surface will be explained further in this description.

Figure 4:
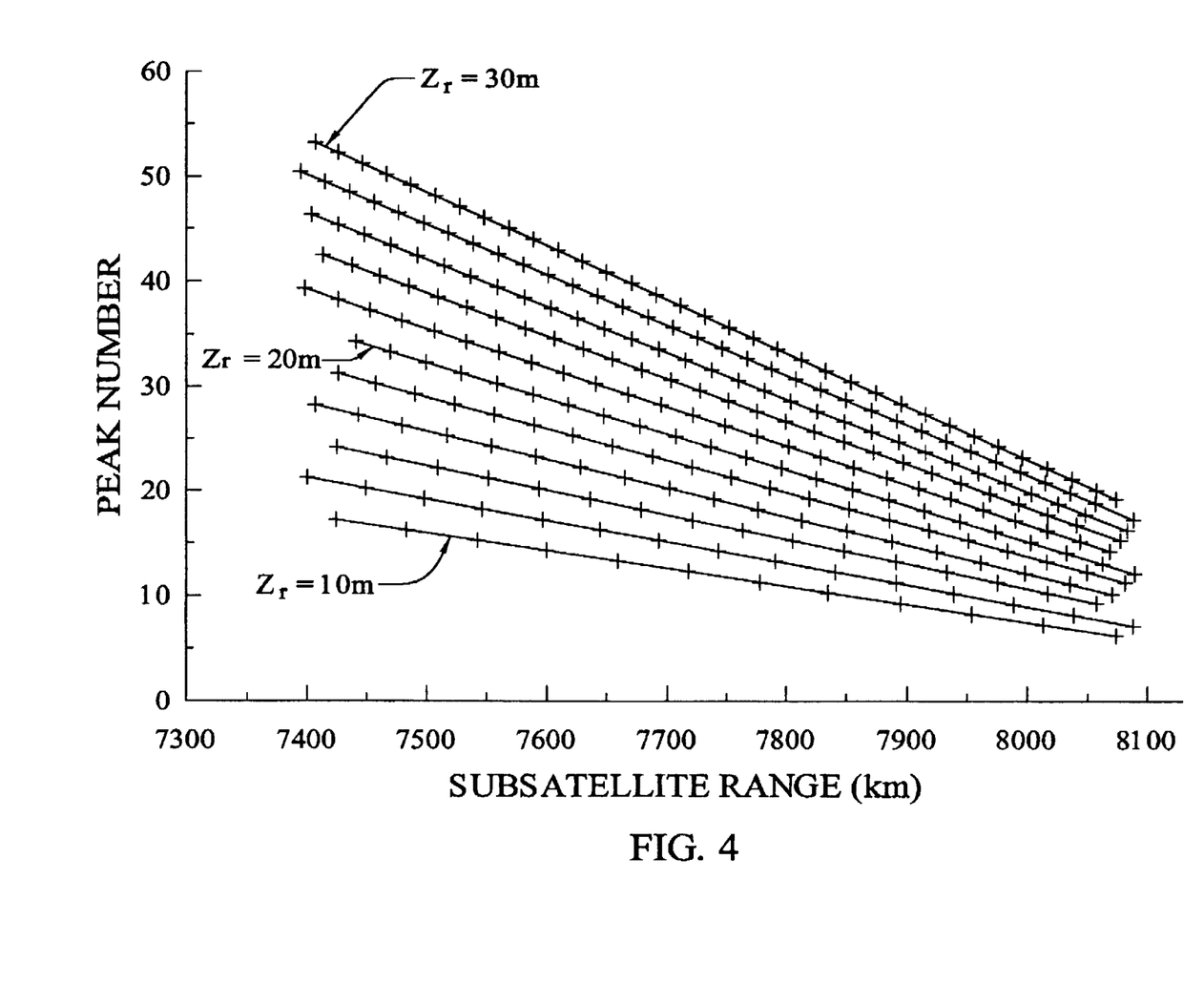
FIG. 4 shows the relationship between "peak" reference numbers and subsatellite range calculated for a number of antenna heights.

Referring now to FIG. 4, there is shown the relationship between the peak number and subsatellite range taken from "reference" interference patterns for a number of known-height antennas (antenna heights from 10 to 30 meters) and for different atmospheric refractive conditions (the gradient of the modified refractivity, dM/dZ, varies from 100 to 130 M units per kilometer). The ray optics ray trace again uses the GPS L1 signal captured by an antenna height $Z_r$ of 10, 12, . . . 30 meters.

Referring once again to FIG. 4, for geometric elevation angles from about 10° to 3°, corresponding to ground ranges from about 7400 to 8100 kilometers for GPS satellites, atmospheric refraction has a small affect on the position of an interference peak, but this affect can be taken into consideration by examining and comparing the gradient of the peak reference numbers with respect to subsatellite range.

If the gradient of peak number with respect to subsatellite ranges is defined as $\delta P/\delta R$, the result of ray optic calculations, illustrated in FIG. 4, show that $\delta P/\delta R$ is nearly linear so that one can express receiver antenna height, Z, as a linear function of $\delta P/\delta R$.

Figure 5:
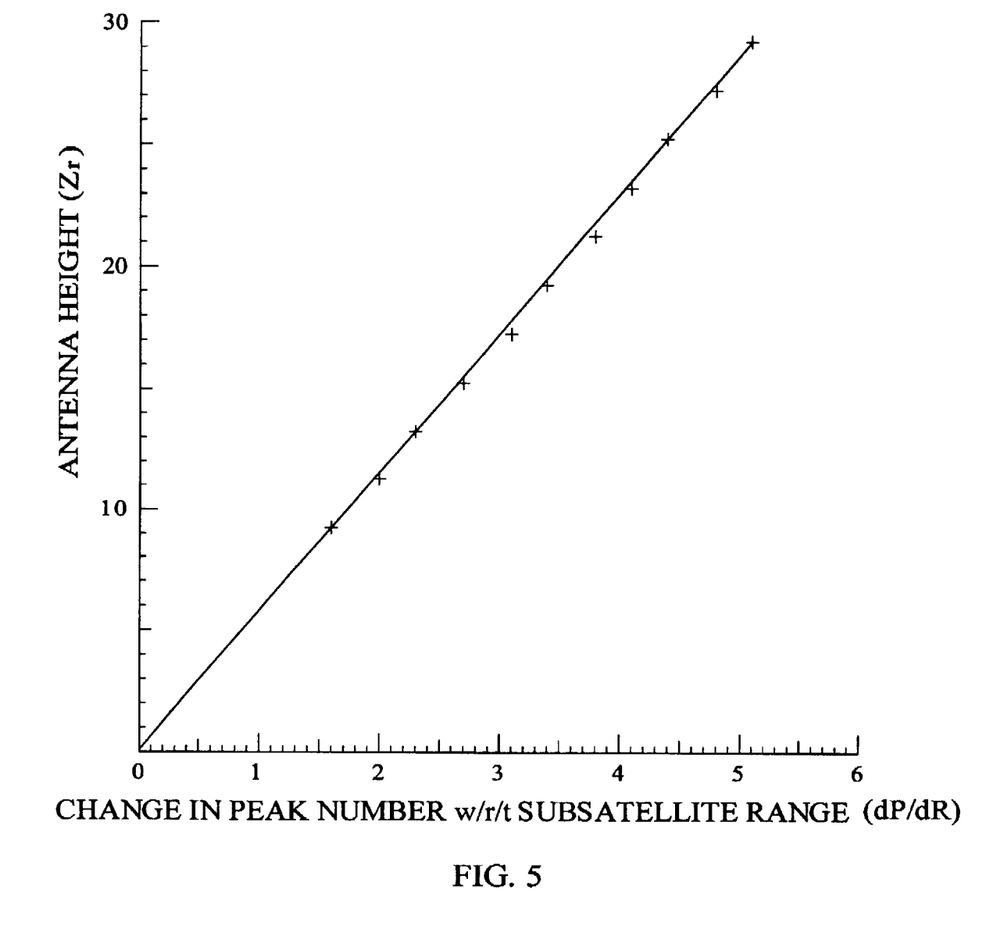
FIG. 5 depicts the substantially linear relationship between the gradient of peak number with respect to range for known antenna height.

In FIG. 5, antenna height $Z_r$ is shown plotted versus $\delta P/\delta R$, or change in peak number with respect to subsatellite range. A standard mathematical linear regression (such as least squares fit, cubic spline fit, polynomial, exponential, logarithmic, etc.) of the data shown in FIG. 4 is then made. This regression yields the relation $$Z = 0.01 - (594.518)\delta P/\delta R, \quad (\text{Eq. 1})$$

where the standard deviation of the error is 0.0166 and the coefficient of determination is 0.999992, validating the claim of linearity. Using this relationship, the height of an antenna of unknown height above a reflecting surface can be determined according to the invention.

For transmission frequencies besides that of the L1 signal (1,575.42 MHz) the following antenna height relationship may be used $$Z = 0.01 - \left(594.514 \times \frac{1575.42}{f(\text{MHz})}\right)\delta P/\delta R \quad (\text{Eq. 2})$$

Referring once again to FIG. 2, there is shown an interference pattern as received by an antenna of interest. Though the height of the antenna used to assemble the data shown in FIG. 2 was known at the time this data was assembled, to demonstrate the invention the assumption will be made that the height of the antenna returning the data of FIG. 2 is not known.

According to the invention, points on the interference pattern are selected at substantially the same phase angle for each cycle of the interference pattern. Though in FIG. 2 the peaks of the interference pattern cycles have been chosen, the selection of other points could be made providing that these are at the same phase angle for each cycle of the interference pattern. Once points on the interference pattern are designated, sequential reference numbers are assigned to the points. In the case illustrated, the location of the points selected fall upon the peaks of the interference pattern and hence these reference numbers are referred to as peak numbers. The peak numbers are assigned to increase sequentially as the measurement indicative of distance between the signal source and the receiving antenna (subsatellite range) decreases.

In FIG. 3 a plot of the reference (peak) numbers with respect to this measurement is generated. The slope or gradient $\delta P/\delta R$ for the data shown in FIG. 3 equals $-0.035533$. When this slope is entered into the reference interference pattern derived equation describing antenna height as a linear function, Eq. 1, an antenna height of 21.135 meters is calculated. In actuality, the antenna was known at the time to have been at a height of 21.2 meters above a water surface.

Figure 6:
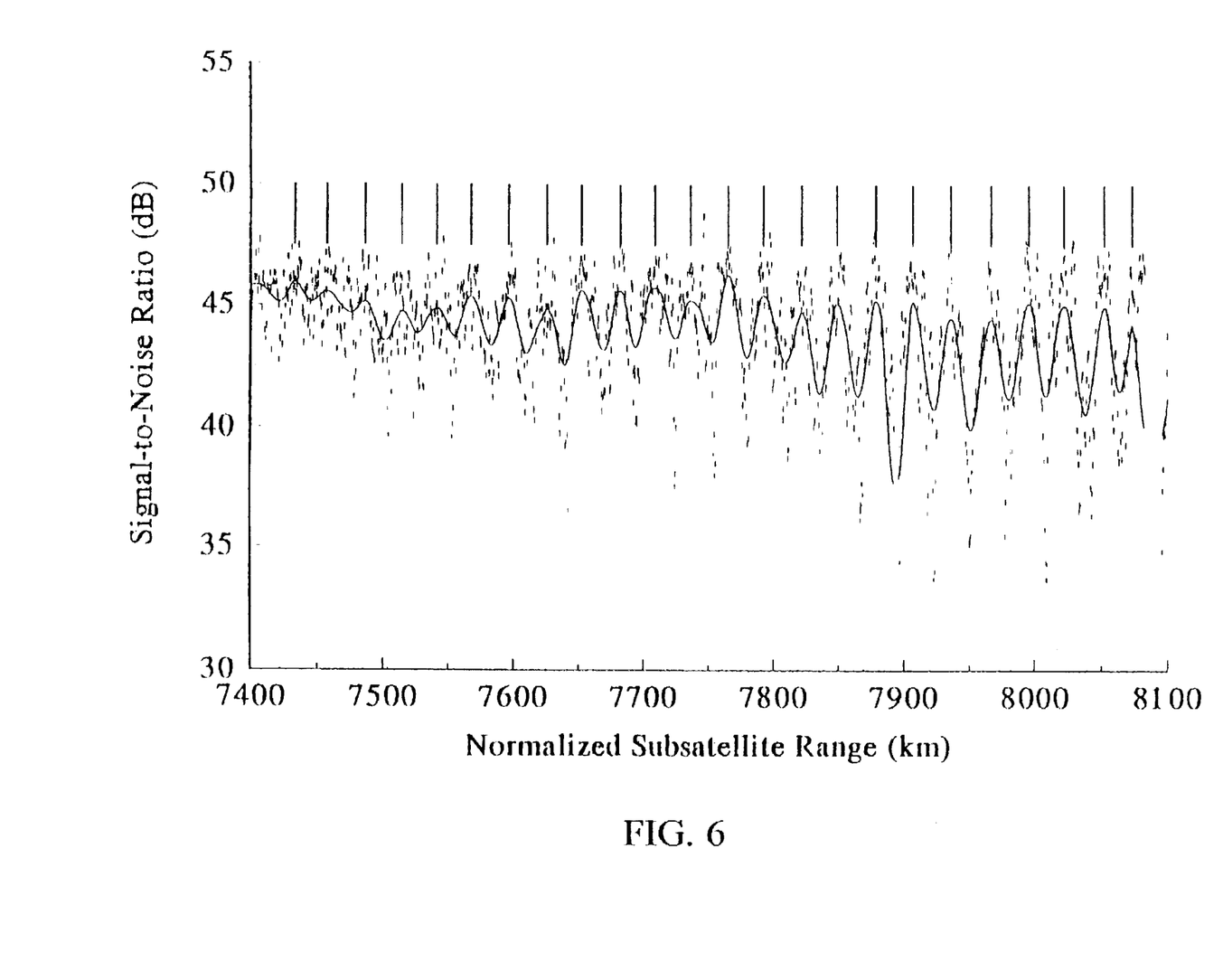
FIG. 6 is an example of an interference pattern created using a Global Positioning System (GPS) satellite.

FIG. 6 is an example of an interference pattern measured using a GPS satellite (satellite vehicle number 10 broadcasting pseudo-random noise code 12 or simply satellite 12). The small slashes indicate the actual SNR of the receiver's Clear Acquisition (CA) control loop; the dark solid line being a smooth and filtered version of the CA SNR. Vertical hash marks identify the location of interference peaks. A linear regression of the measurement gives a $\delta P/\delta R$ of $-0.03565554$ (the standard deviation of the error is 0.0158 and the coefficient of determination is 0.99982), which implies that the height of the antenna above water is 21.21 meters. The measured height above water (based on the Scripps Pier tide gauge) was at the time 21.19 meters. The results of this technique yield a calculated antenna height that is within 2 cm of the height determined by tide gauge.

If, of course, one had an accurate determination of an antenna's height above a water surface, the invention could be used to gauge the rise and fall of the surface, as in a tide gauge. The difference between the height of the antenna and the surface could be determined. This distance could then be subtracted from the antenna's height to give a tide height reading. Alternatively, the height of a ship-mounted antenna could be used to determine displacement and freeboard of the ship.

An advantage of this invention is that antenna height can be determined by using remote sensing techniques that are nonintrusive. When the invention is used as a tide gauge, there is no requirement to install equipment within the body of water whose height is to be determined.

Obviously, many modifications and variations of the invention are possible in light of the above teachings. It is therefore to be understood that within the scope of the appended claims the invention may be practiced otherwise than as has been specifically described.

What is claimed is:

1. A method for determining the distance of a transducer from a surface comprising the steps of:

(a) transmitting a signal from a source;

(b) receiving on said transducer said signal directly from said signal source, said transducer being an unknown distance from said surface (c) receiving on said transducer said signal indirectly from said source by way of a reflection of said signal from said surface;

(d) moving said source with respect to said transducer;

(e) repeating steps a, b and c as said source moves;

(f) generating an interference pattern from said directly and indirectly received signals, said interference pattern depicting a signal characteristic with respect to a measurement indicative of distance between said source and said transducer;

(g) selecting points on said interference pattern at substantially the same phase angle of each cycle of said interference pattern;

(h) assigning sequential reference numbers to said points;

(i) creating a plot of said reference numbers with respect to said measurement;

(j) determining the slope of said plot;

(k) generating reference interference patterns for a plurality of known transducer-to-surface distances;

(l) repeating steps g–j for said reference interference patterns;

(m) creating a plot of said reference interference pattern slopes determined in step l with respect to said known transducer-to-surface distances;

(n) describing said plot created in step m in terms of an equation relating said known transducer-to-surface distances with respect to said slopes created in step m; and (o) inserting said slope determined in step j into said equation and solving for said unknown distance.

2. The method of claim 1 in which at least one of the reference interference patterns generated in step k are mathematically modelled.

3. The method of claim 1 in which at least one of the reference interference patterns generated in step k are physically measured.

4. The method of claim 1 in which at least one of the reference interference patterns generated in step k is determined through ray-optics.

5. The method of claim 1 in which linear regression analysis is used in step n in describing said plot created in step m in terms of an equation relating said known transducer-to-surface distances with respect to said slopes created in step m.

6. A method according to claim 1 in which said reflecting surface is water.

7. A method according to claim 6 in which said step of moving said source includes moving said source through the air.

8. A method according to claim 6 in which said step of moving said source includes moving said source through the space.

9. A method according to claim 1 in which said transducer is an antenna.

10. A method according to claim 1 in which said transducer is an optical receptor.

11. A method according to claim 1 in which said transducer is an acoustic receptor.

12. A method according to claim 6 in which said transducer is an antenna.

13. A method according to claim 6 in which said transducer is an optical receptor.

14. A method according to claim 6 in which said transducer is an acoustic receptor.

* * * * *